US010948919B2

(12) United States Patent
Zhu et al.

(10) Patent No.: US 10,948,919 B2
(45) Date of Patent: Mar. 16, 2021

(54) DYNAMIC PROGRAMMING AND GRADIENT DESCENT BASED DECISION AND PLANNING FOR AUTONOMOUS DRIVING VEHICLES

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 130 days.

(21) Appl. No.: 15/701,422

(22) Filed: Sep. 11, 2017

(65) Prior Publication Data

US 2019/0079528 A1 Mar. 14, 2019

(51) Int. Cl.
*G05D 1/02* (2020.01)
*B60W 30/095* (2012.01)
*G01C 21/34* (2006.01)

(52) U.S. Cl.
CPC ......... *G05D 1/0223* (2013.01); *B60W 30/095* (2013.01); *G01C 21/3453* (2013.01); *G05D 1/0217* (2013.01); *G05D 1/0238* (2013.01); *G05D 1/0248* (2013.01); *G05D 1/0274* (2013.01); *B60W 2720/103* (2013.01); *G05D 2201/0213* (2013.01)

(58) Field of Classification Search
CPC ............. G05D 1/0223; B60W 30/095
See application file for complete search history.

(56) References Cited

U.S. PATENT DOCUMENTS

| | | | |
|---|---|---|---|
| 2013/0179067 A1* | 7/2013 | Trowbridge | G01C 21/34 701/410 |
| 2014/0309836 A1* | 10/2014 | Ollis | G01C 21/00 701/25 |
| 2015/0344030 A1* | 12/2015 | Damerow | B60W 30/0956 701/1 |
| 2015/0347872 A1* | 12/2015 | Taylor | G06K 9/3233 382/224 |
| 2016/0247106 A1* | 8/2016 | Dalloro | G06Q 10/06313 |
| 2018/0004213 A1* | 1/2018 | Absmeier | G05D 1/0214 |
| 2018/0129203 A1* | 5/2018 | Tafti | G05D 1/0005 |
| 2018/0292531 A1* | 10/2018 | Xie | G01S 15/08 |

* cited by examiner

*Primary Examiner* — Jess Whittington
(74) *Attorney, Agent, or Firm* — Womble Bond Dickinson (US) LLP

(57) ABSTRACT

According to some embodiments, a system calculates a first trajectory based on a map and a route information. The system generates a path profile based on the first trajectory, traffic rules, and an obstacle information describing one or more obstacles perceived by the ADV, where for each of the obstacles, the path profile includes a decision to yield or nudge to left or right of the obstacle. The system generates a speed profile based on the path profile in view of the traffic rules. The system performs a gradient descent optimization based on the path profile and the speed profile to generate a second trajectory representing an optimized first trajectory and controls the ADV according to the second trajectory.

21 Claims, 18 Drawing Sheets

DYNAMIC PROGRAMMING AND GRADIENT DESCENT BASED DECISION AND PLANNING FOR AUTONOMOUS DRIVING VEHICLES

RELATED APPLICATIONS

This application is related to co-pending U.S. patent application Ser. No. 15/701,411, entitled "DP and QP Based Decision and Planning for Autonomous Driving Vehicles," filed, Sep. 11, 2017, and co-pending U.S. patent appliction Ser. No. 15/701,427, entitled "Cost Based Path Planning for Autonomous Driving Vehicles," filed, Sep. 11, 2017. The disclosure of the above applications is incorporated by reference herein in its entirety.

TECHNICAL FIELD

Embodiments of the present disclosure relate generally to operating autonomous vehicles. More particularly, embodiments of the disclosure relate to dynamic programming (DP) and gradient descent based decision and planning for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, they can be open-ended and can be difficult to optimize without some initial constraints. Furthermore, motion planning and control is applied to all types of vehicles, which may not be accurate and smooth under some circumstances.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
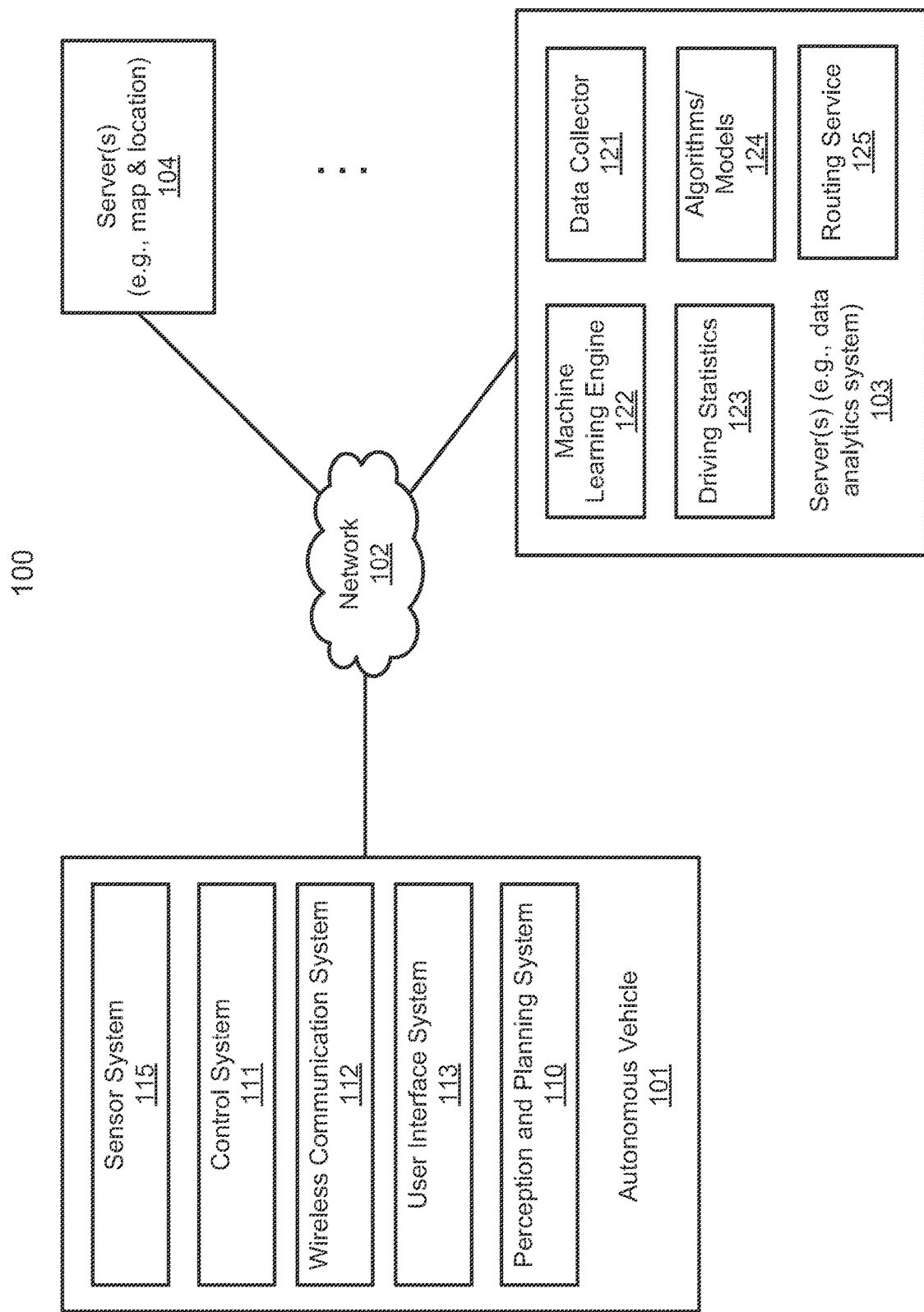
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an ADV includes a decision and planning system to control the ADV autonomously. Based on a start and an end locations, the system queries a routing service for reference routes and calculates a reference line to drive the ADV from the start to end locations. Based on perceived obstacles surrounding the ADV and traffic, the system determines path and speed decisions to ignore, pass, yield, or overtake the obstacles in view of traffic rules and/or status of the ADV. The system optimizes one or more reference lines based on the paths and speeds decisions as trajectories to plan when and where the car should be at a particular point in time.

According to one aspect, a system calculates a first trajectory based on a map and a route information. The system generates a path profile based on the first trajectory, traffic rules, and an obstacle information describing one or more obstacles perceived by the ADV. The system generates a speed profile based on the path profile, where the speed profile includes, for each of the obstacles, a decision to yield or overtake the obstacle. The system performs a quadratic programming optimization on the path profile and the speed profile to identify an optimal path with optimal speed and generates a second trajectory based on the optimal path and optimal speeds such that the ADV can be controlled autonomously based on the second trajectory. The second trajectory represents the optimized first trajectory using quadratic programming optimization.

According to another aspect, a system calculates a first trajectory based on a map and a route information. The system generates a path profile based on the first trajectory, traffic rules, and an obstacle information describing one or more obstacles perceived by the ADV, where for each of the obstacles, the path profile includes a decision to yield or nudge to left or right of the obstacle. The system generates a speed profile based on the path profile in view of the traffic rules. The system performs a gradient descent optimization based on the path profile and the speed profile to generate a second trajectory representing an optimized first trajectory and controls the ADV according to the second trajectory.

According to a further aspect, a system generates a number of possible decisions for routing the ADV from a first location to a second location based on perception information perceiving a driving environment surrounding the ADV, including one or more obstacles in view of a set of traffic rules. The system calculates a number of trajectories based on a combination of one or more of the possible decisions. The system calculates a total cost for each of the trajectories using a number of cost functions and selects one of the trajectories with a minimum total cost as the driving trajectory to control the ADV autonomously. The cost functions include a path cost function, a speed cost function, and an obstacle cost function.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
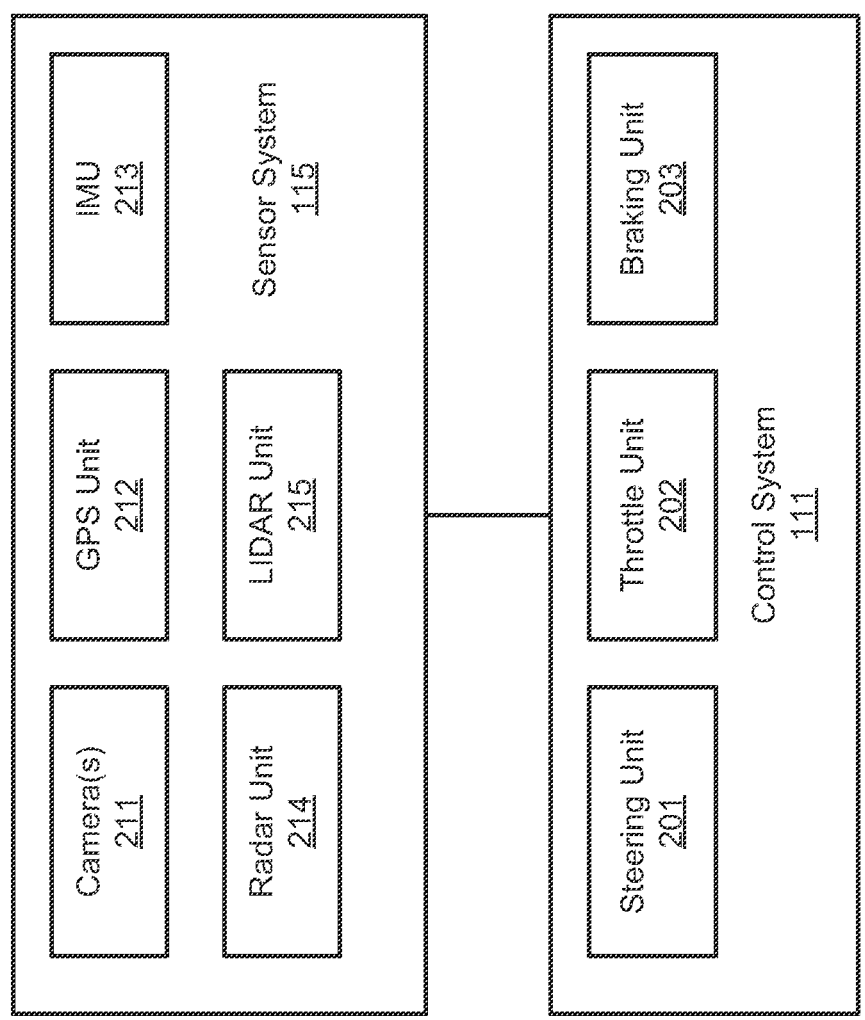
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, server 103 may include routing service 125 to provide a routing service (e.g., routes and map information) to ADV 101. ADV 101 can request for reference routes from routing service 125 by indicating a start and an end location (e.g., an ideal route without obstacle information or traffic condition). Routing service 125 then returns the requested routes. In one embodiment, returning reference routes can include returning one or more tables such as a reference points table and a road segments/lanes table. Alternatively, the route and map information can be downloaded and cached in the vehicles, which can be used at real-time.

Server 103 can generate reference routes, for example, machine learning engine 122 can generate reference routes from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, machine-learning engine 122 can connect midpoints of two opposing curbs or extremities of the vehicular lane provided by a map data. Based on the midpoints and machine learning data representing collected data points of vehicles previously driven on the vehicular lane at different points in time, engine 122 can calculate the reference points by selecting a subset of the collected data points within a predetermined proximity of the vehicular lane and applying a smoothing function to the midpoints in view of the subset of collected data points.

Based on reference points or lane reference points, an ADV receiving the reference points may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane. Note that the above process is performed offline by the analytics server 103, where the reference points of routes are determined based on the route and map information. However, the same data can be dynamically determined within each individual vehicle at real-time, which will be described in details further below.

Figure 3A:
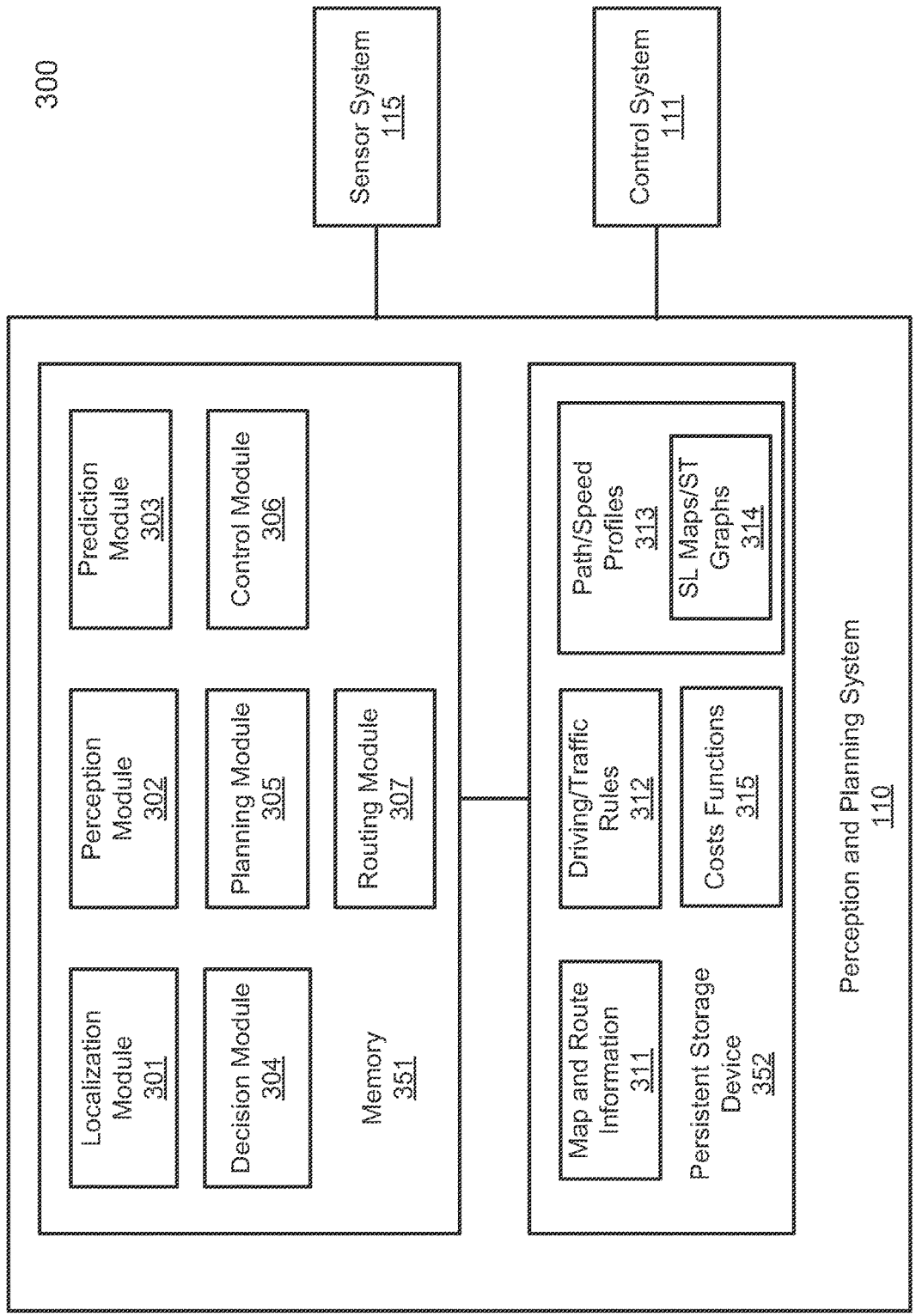
FIGS. 3A-3B are block diagrams illustrating an example of a perception and planning system used with an autonomous vehicle according to one embodiment.
Figure 3B:
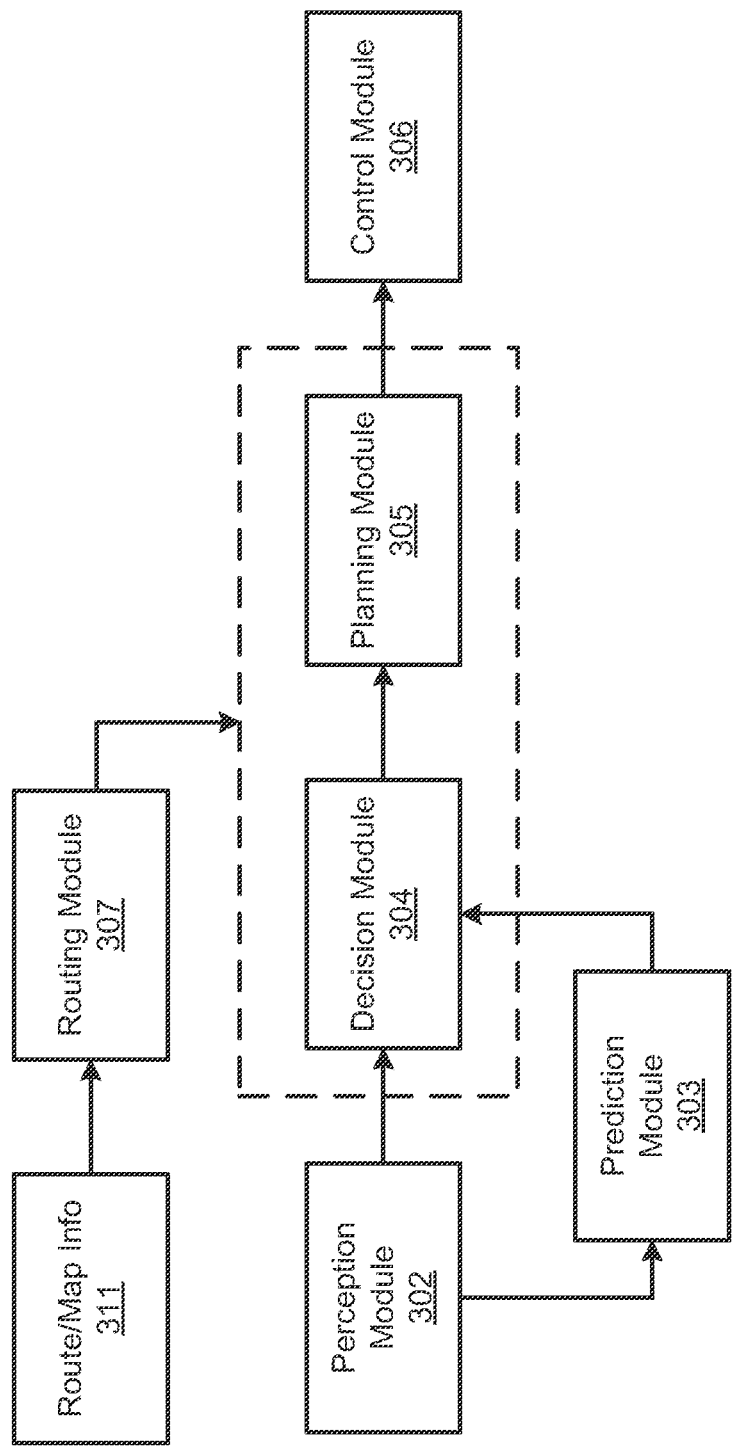

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

For example, a road segments table can be a name-value pair to include previous and next road lanes for road segments A-D. E.g., a road segments table may be: {(A1, B1), (B1, C1), (C1, D0} for road segments A-D having lane 1. A reference points table may include reference points in x-y coordinates for road segments lanes, e.g., {(A1, (x1, y1)), (B1, (x2, y2)), (C1, (x3, y3)), (D1, (x4, y4))}, where A1 . . . D1 refers to lane 1 of road segments A-D, and (x1, y1) . . . (x4, y4) are corresponding real world coordinates. In one embodiment, road segments and/or lanes are divided into a predetermined length such as approximately 200 meters segments/lanes. In another embodiment, road segments and/or lanes are divided into variable length segments/lanes depending on road conditions such as road curvatures. In some embodiments, each road segment and/or lane can include several reference points. In some embodiments, reference points can be converted to other coordinate systems, e.g., latitude-longitude.

In some embodiments, reference points can be converted into a relative coordinates system, such as station-lateral (SL) coordinates. A station-lateral coordinate system is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and an one meter lateral offset from the reference line, e.g., offset to the left by one meter.

In one embodiment, decision module 304 generates a rough path profile based on a reference line provided by routing module 307 and based on obstacles perceived by the ADV, surrounding the ADV. The rough path profile can be a part of path/speed profiles 313 which may be stored in persistent storage device 352. The rough path profile is generated by selecting points from the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs 314 which may be stored in persistent storage devices 352.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP). In one embodiment, the recalculated rough path profile includes a station-lateral map (as part of SL maps/ST graphs 314).

In one embodiment, planning module 305 recalculates the rough speed profile using quadratic programming (QP) to optimize a speed cost function (as part of cost functions 315). Similar speed barrier constraints can be added to forbid the QP solver to search for some forbidden speeds. In one embodiment, the recalculated rough speed profile includes a station-time graph (as part of SL maps/ST graphs 314).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
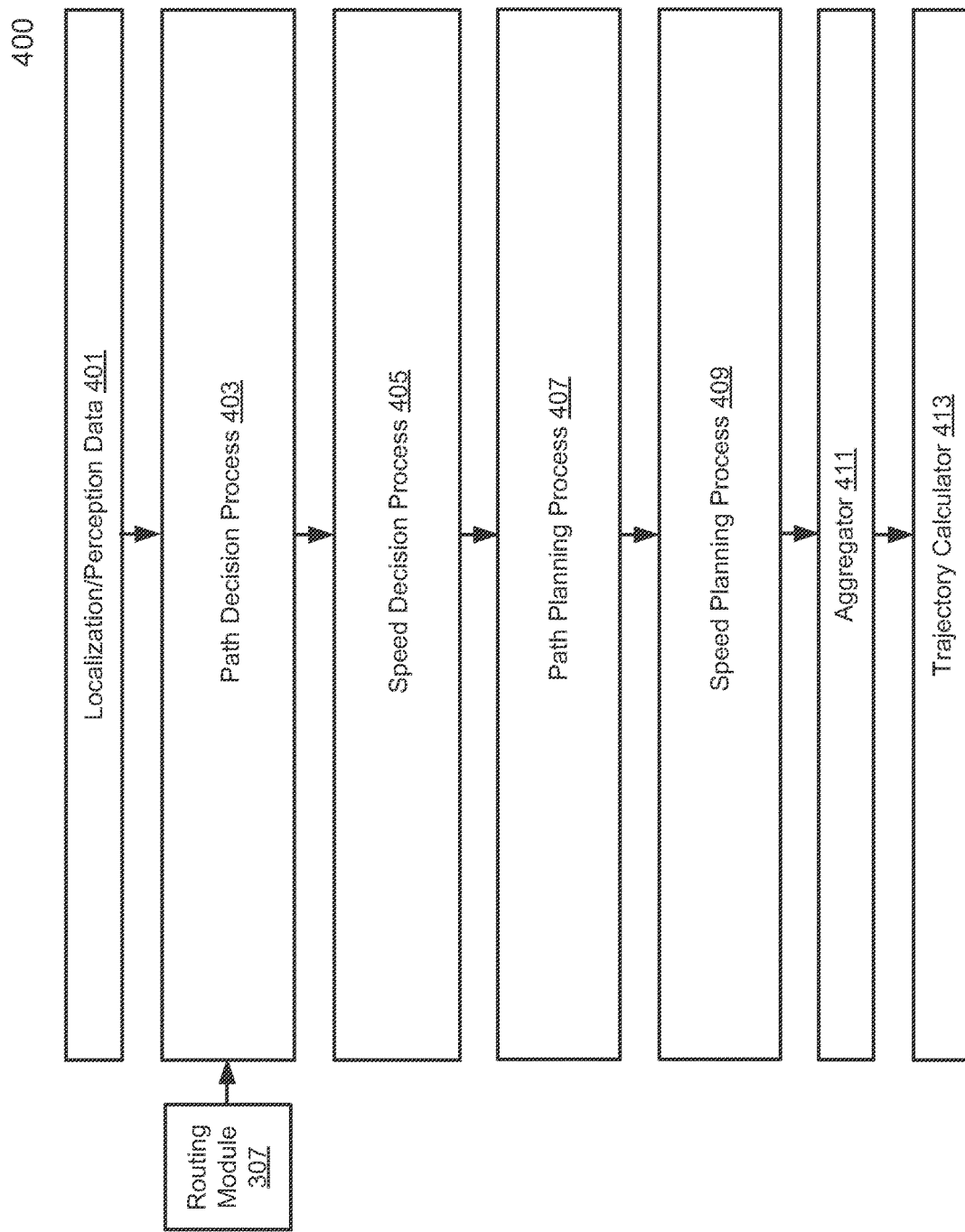
FIG. 4 is a block diagram illustrating an example of a decision and a planning processes according to one embodiment.
Figure 5A:
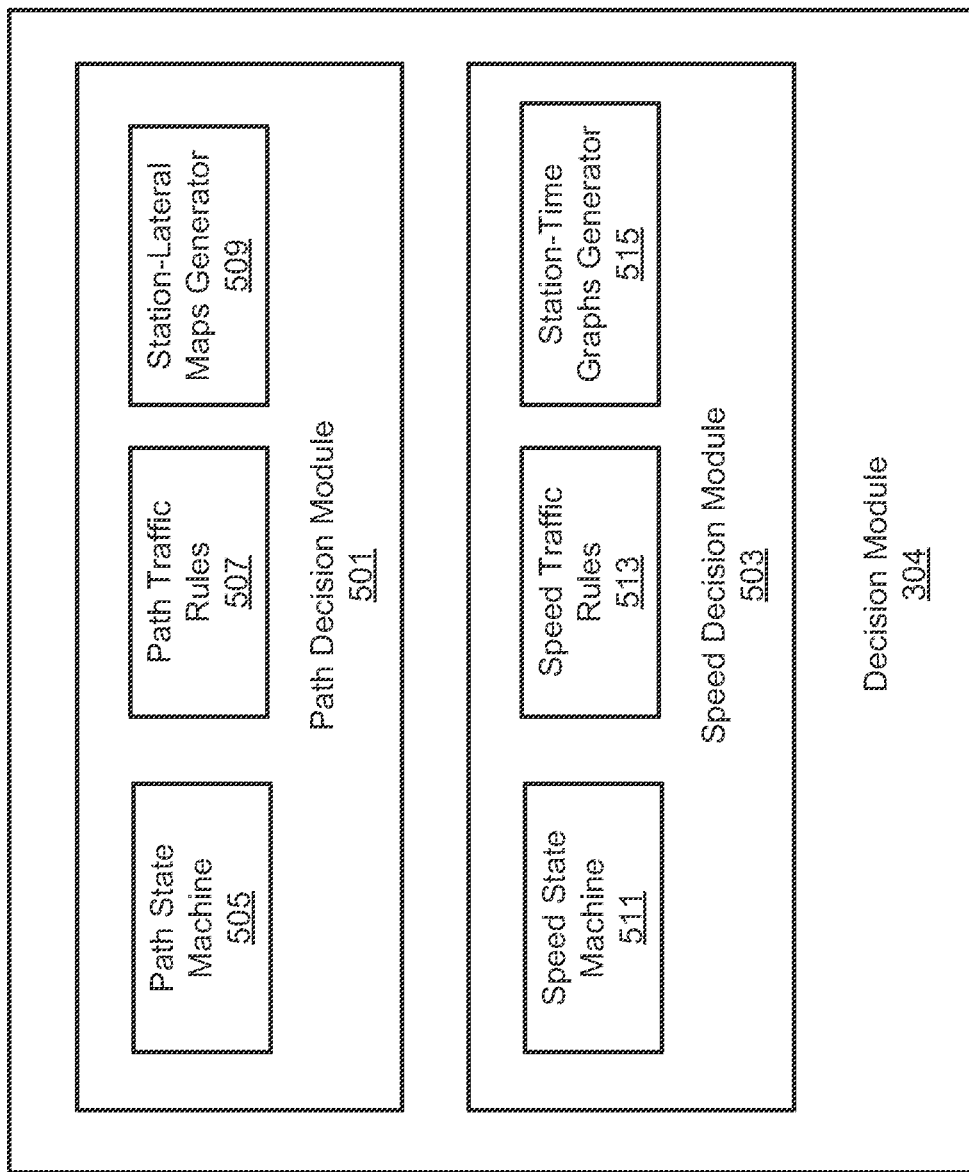
FIG. 5A is a block diagram illustrating an example of a decision module according to one embodiment.
Figure 5B:
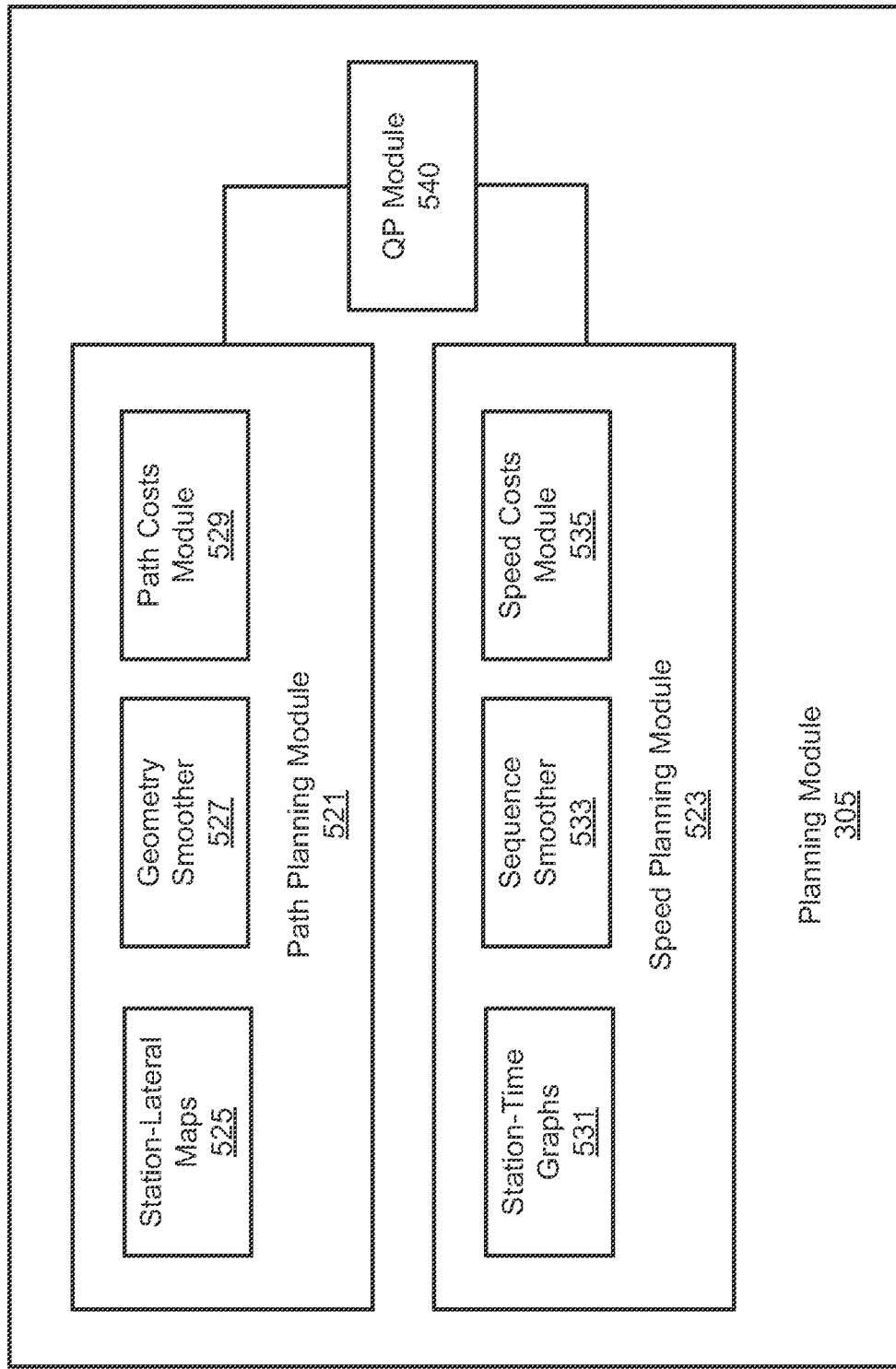
FIG. 5B is a block diagram illustrating an example of a planning module according to one embodiment.

FIG. 4 is a block diagram illustrating an example of a decision and planning process according to one embodiment. FIG. 5A is a block diagram illustrating an example of a decision module according to one embodiment. FIG. 5B is a block diagram illustrating an example of a planning module according to one embodiment. Referring to FIG. 4, Decision and planning process 400 includes routing module 307, localization/perception data 401, path decision process 403, speed decision process 405, path planning process 407, speed planning process 409, aggregator 411, and trajectory calculator 413.

Path decision process 403 and speed decision process 405 may be performed respectively by a path decision module 501 and a speed decision module 503 of decision module 304 in FIG. 5A. Referring to FIG. 4 and FIG. 5A, path decision process 403 or path decision module 501 includes path state machine 505, path traffic rules 507, and station-lateral maps generator 509. Path decision process 403 or path decision module 501 can generate a rough path profile as an initial constraint for the path/speed planning processes 407 and 409 using dynamic programming. In one embodiment, path state machine 505 includes at least three states: cruising, changing lane, and idle states. Path state machine 505 provides previous planning results and important information such as whether the ADV is cruising or changing lanes. Path traffic rules 507, as part of driving/traffic rules 312 of FIG. 3A, include traffic rules that can affect the outcome of a path decisions module. For example, path traffic rules 507 can include traffic information such as construction traffic signs thereby the ADV can avoid lanes with such construction signs. From the states, traffic rules, reference line provided by routing module 307, and obstacles perceived by the ADV, path decision process 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. In one embodiment, SL maps generator 509 generates a station-lateral map as part of the rough path profile. A station-lateral map is a two-dimensional geometric map (similar to an x-y coordinate plane) that includes obstacles information perceived by the ADV. From the SL map, path decision process 403 can lay out an ADV path that follows the obstacle decisions. Dynamic programming (or dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision process 405 or speed decision module 503 includes speed state machine 511, speed traffic rules 513, and station-time graphs generator 515. Speed decision process 405 or speed decision module 503 can generate a rough speed profile as an initial constraint for the path/speed planning processes 407 and 409 using dynamic programming. In one embodiment, speed state machine 511 includes at least two states: speed up, or slow down. Speed traffic rules 513, as part of driving/traffic rules 312 of FIG. 3A, include traffic rules that can affect the outcome of a speed decisions module. For example, speed traffic rules 513 can include traffic information such as red/green traffic lights, another vehicle in a crossing route, etc. From a state of the speed state machine, speed traffic rules, rough path profile/ SL map generated by decision process 403, and perceived obstacles, speed decision process 405 can generate a rough speed profile to control when to speed up and/or slow down the ADV. Station-time graphs generator 515 can generate a station-time graph as part of the rough speed profile.

Referring to FIG. 4 and FIG. 5B, path planning process 407 or path planning module 521 includes station-lateral maps 525, geometry smoother 527, and path costs module 529. Station-lateral maps 525 can include the station-lateral maps generated by SL maps generator 509 of path decision process 403. Path planning process 407 or path planning module 521 can use a rough path profile (e.g., a station-lateral map) as the initial constraint to recalculate an optimal reference line using quadratic programming. Quadratic programming involves minimizing or maximizing an objective function (e.g., a quadratic function with several variables) subject to bounds, linear equality, and inequality constraints. One difference between dynamic programming and quadratic programming is that quadratic programming optimizes all candidate movements for all points on the reference line at once. Geometry smoother 527 can apply a smoothing algorithm (such as B-spline or regression) to the output station-lateral map. Path costs module 529 can recalculate a reference line with a path cost function, as part of cost functions 315 of FIG. 3A, to optimize a total cost for candidate movements for reference points, for example, using QP optimization performed by QP module 540. For example, in one embodiment, a total path cost function can be:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance is the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, path costs module 529 can recalculate a reference line by minimizing the path cost using quadratic programming optimization, for example, by QP module 540.

Speed planning process 409 or speed planning module 523 includes station-time graphs 531, sequence smoother 533, and speed costs module 535. Station-time graphs 531 can include the station-time (ST) graph generated by ST graphs generator 515 of speed decision process 405. Speed planning process or speed planning module 523 can use a rough speed profile (e.g., a station-time graph) and results from path planning process 407 as initial constraints to calculate an optimal station-time curve. Sequence smoother 533 can apply a smoothing algorithm (such as B-spline or regression) to the time sequence of points. Speed costs module 535 can recalculate the ST graph with a speed cost function, as part of cost functions 315 of FIG. 3A, to optimize a total cost for movement candidates (e.g., speed up/slow down) at different points in time. For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speeds cost are summed over all time progression points, speed' denotes an acceleration value or a cost to change speed between two adjacent points, speed" denotes a jerk value, or a derivative of the acceleration value or a cost to change a change of speed between two adjacent points, and distance denotes a distance from the ST point to the destination location. Here, speed costs module 535 calculates a station-time graph by minimizing the speed cost using quadratic programming optimization, for example, by QP module 540.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on 2 consecutive points on a SL reference line or ST curve. In another embodiment, aggregator 411 can translate reference points from (S, L) coordinates to (x, y) coordinates. Trajectory generator 413 can calculate the final trajectory to control the ADV. For example, based on the SLT graph provided by aggregator 411, trajectory generator 413 calculates a list of (x, y, T) points indicating at what time should the ADC pass a particular (x, y) coordinate.

Thus, referring back to FIG. 4, path decision process 403 and speed decision process 405 are to generate a rough path profile and a rough speed profile taking into consideration obstacles and/or traffic conditions. Given all the path and speed decisions regarding the obstacles, path planning process 407 and speed planning process 409 are to optimize the rough path profile and the rough speed profile in view of the obstacles using QP programming to generate an optimal trajectory with minimum path cost and/or speed cost. In another embodiment, path costs and speed costs can be calculated by path cost module 1110 and speed cost module 1120 of FIGS. 12A-12B as described further below.

Figure 6:
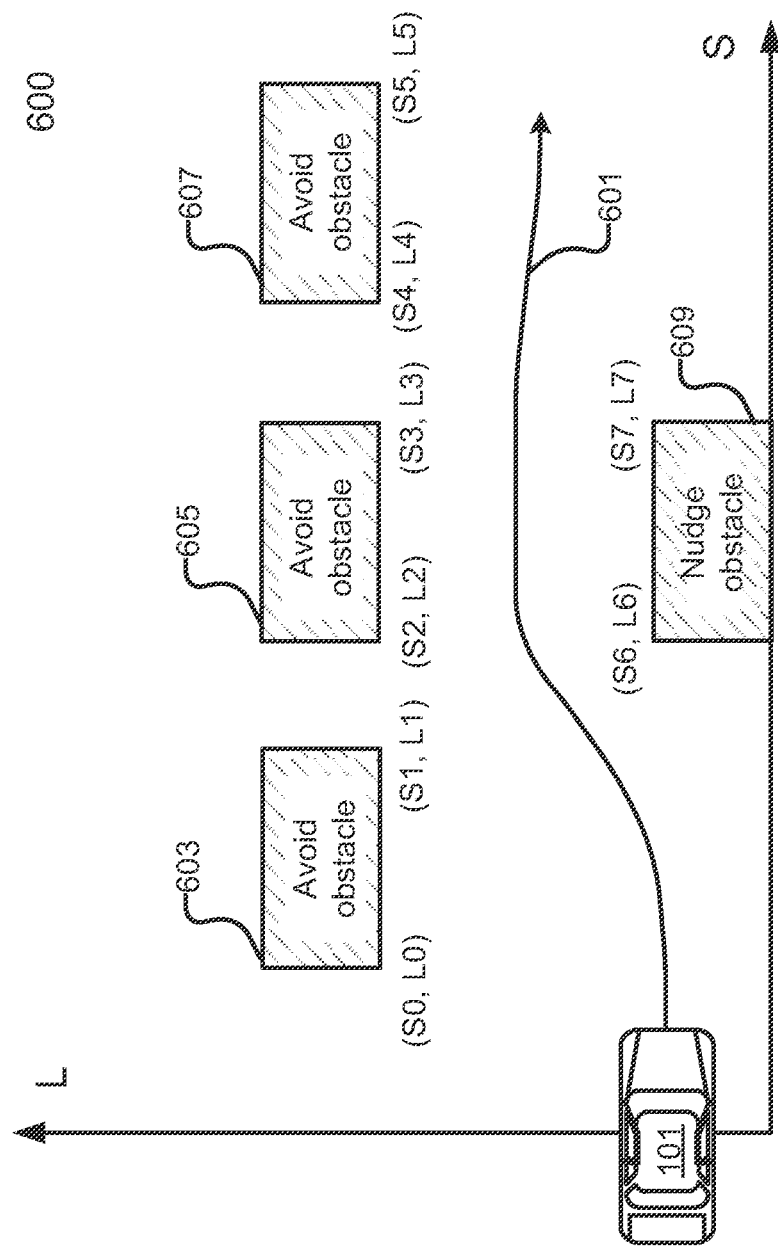
FIG. 6 is a block diagram illustrating a station-lateral map according to one embodiment.

FIG. 6 is a block diagram illustrating a station-lateral map according to one embodiment. Referring to FIG. 6, map 600 has an S horizontal axis, or station, and an L vertical axis, or lateral. As described above, station-lateral coordinates is a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 6, map 600 includes reference line 601 and obstacles 603-609 perceived by an ADV. In one embodiment, obstacles 603-609 may be perceived by a RADAR or LIDAR unit of the ADV in a different coordinate system and translated to the SL coordinate system. In another embodiment, obstacles 603-609 may be artificial formed barriers as constraints so the decision and planning modules would not search in the constrained geometric spaces. In this example, a path decision module such as path decision module 501 can generate decisions for each of obstacles 603-609 such as decisions to avoid obstacles 603-608 and nudge (approach very closely) obstacle 609 (i.e., these obstacles may be other cars, buildings and/or structures). A path planning module such as path planning module 521 can then recalculate or optimize reference line 601 based on a path cost in view of obstacles 603-609 using QP programming to fine tune reference line 601 with the minimum overall cost as described above. In this example, ADV 101 nudges, or approaches very close, for obstacle 609 from the left of obstacle 609.

Figure 7A:
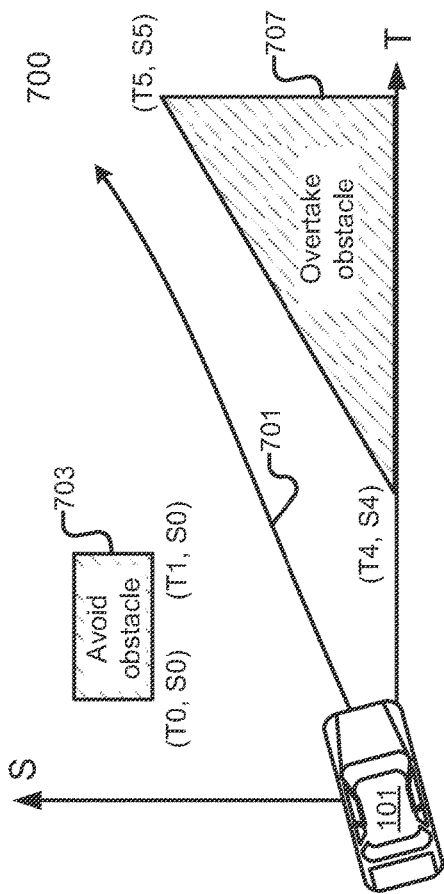
FIGS. 7A-7B are block diagrams illustrating station-time maps according to some embodiments.
Figure 7B:
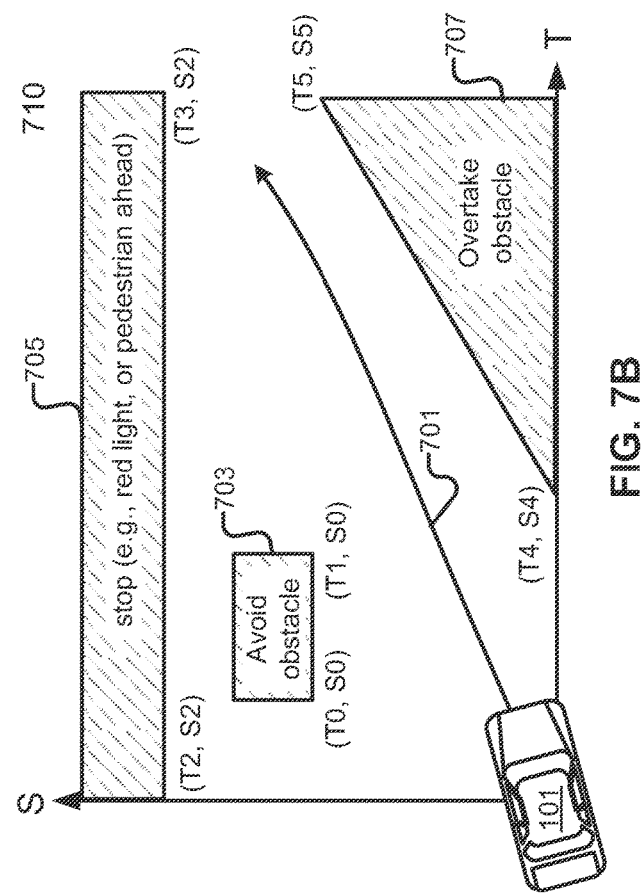

FIGS. 7A and 7B are block diagrams illustrating station-time maps according to some embodiments. Referring to FIG. 7A, graph 700 has a station (or S) vertical axis and a time (or T) horizontal axis. Graph 700 includes curve 701, and obstacles 703-707. As described above, curve 701 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 703 may be a building/structure to be avoided and obstacle 707 may be an artificial barrier corresponding to a decision to overtake a moving vehicle.

Referring to FIG. 7B, in this scenario, artificial barrier 705 is added to the ST graph 710 as a constraint. The artificial barrier can be examples of a red light or a pedestrian in the pathway that is at a distance approximately S2 from the station reference point, as perceived by the ADV. Barrier 705 corresponds to a decision to "stop" the ADV until the artificial barrier is removed at a later time (i.e., the traffic light changes from red to green, or a pedestrian is no longer in the pathway).

Figure 8:
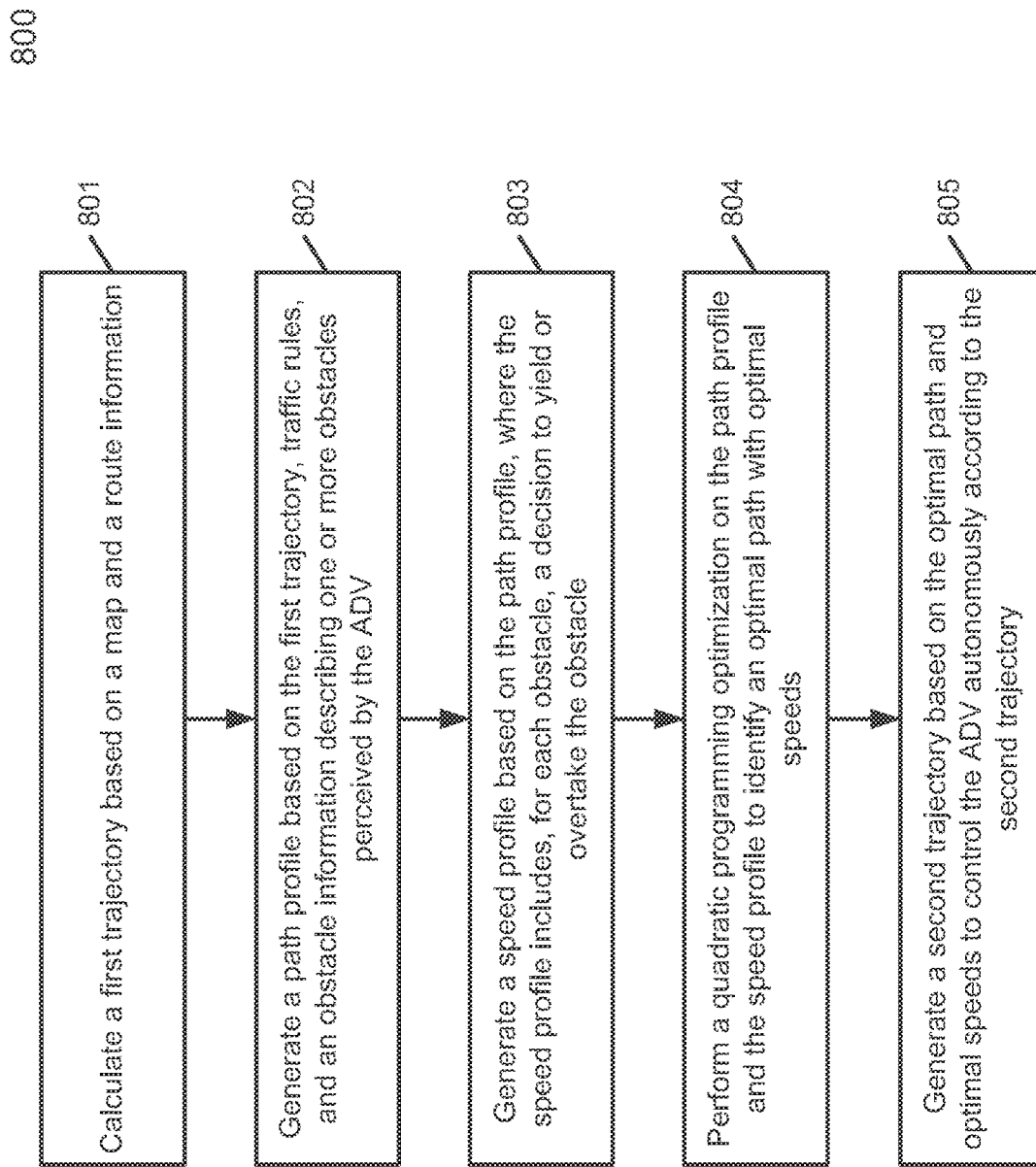
FIG. 8 is a flow diagram illustrating a method according to one embodiment.

FIG. 8 is a flow diagram illustrating a method according to one embodiment. Processing 800 may be performed by processing logic which may include software, hardware, or a combination thereof. For example, process 800 may be performed by perception and planning system 110 of an autonomous vehicle. Referring to FIG. 8, at block 801, processing logic calculates a first trajectory based on a map and a route information. At block 802, processing logic generates a path profile based on the first trajectory, traffic rules, and an obstacle information describing one or more obstacles perceived by the ADV. At block 803, processing logic generates a speed profile based on the path profile, where the speed profile includes, for each of the obstacles, a decision to yield or overtake the obstacle. At block 804, processing logic performs a quadratic programming optimization on the path profile and the speed profile to identify an optimal path with optimal speeds. Quadratic programming optimization can be performed using respective path, speed, and/or obstacle cost functions to determine the most optimal route with the minimum total cost. At block 805, processing logic generates a second trajectory based on the optimal path and optimal speeds to control the ADV autonomously according to the second trajectory.

In one embodiment, the path profile and the speed profile are generated iteratively using dynamic programming. In one embodiment, the path profile includes, for each encountered obstacle decisions, a decision to avoid, yield, ignore, or nudge to a left or a right side of the encountered obstacle.

In one embodiment, performing a quadratic programming optimization on the path profile and the speed profile includes optimizing a first cost function (e.g., path cost function(s)) using quadratic programming to generate a station-lateral map based on the path profile, and optimizing a second cost function (e.g., speed cost function(s)) using quadratic programming to generate a station-time graph based on the speed profile. In another embodiment, the station-lateral map is generated by forming one or more barriers based on one or more obstacle decisions. In another embodiment, the first cost function includes a heading, a curvature, and/or a distance costs. In another embodiment, the second cost function includes an acceleration, a jerk, and/or a distance costs. In another embodiment, processing logic further interpolates a number of points to the second trajectory that are absent from the first trajectory based on the station-lateral map and the station-time graph.

Figure 9:
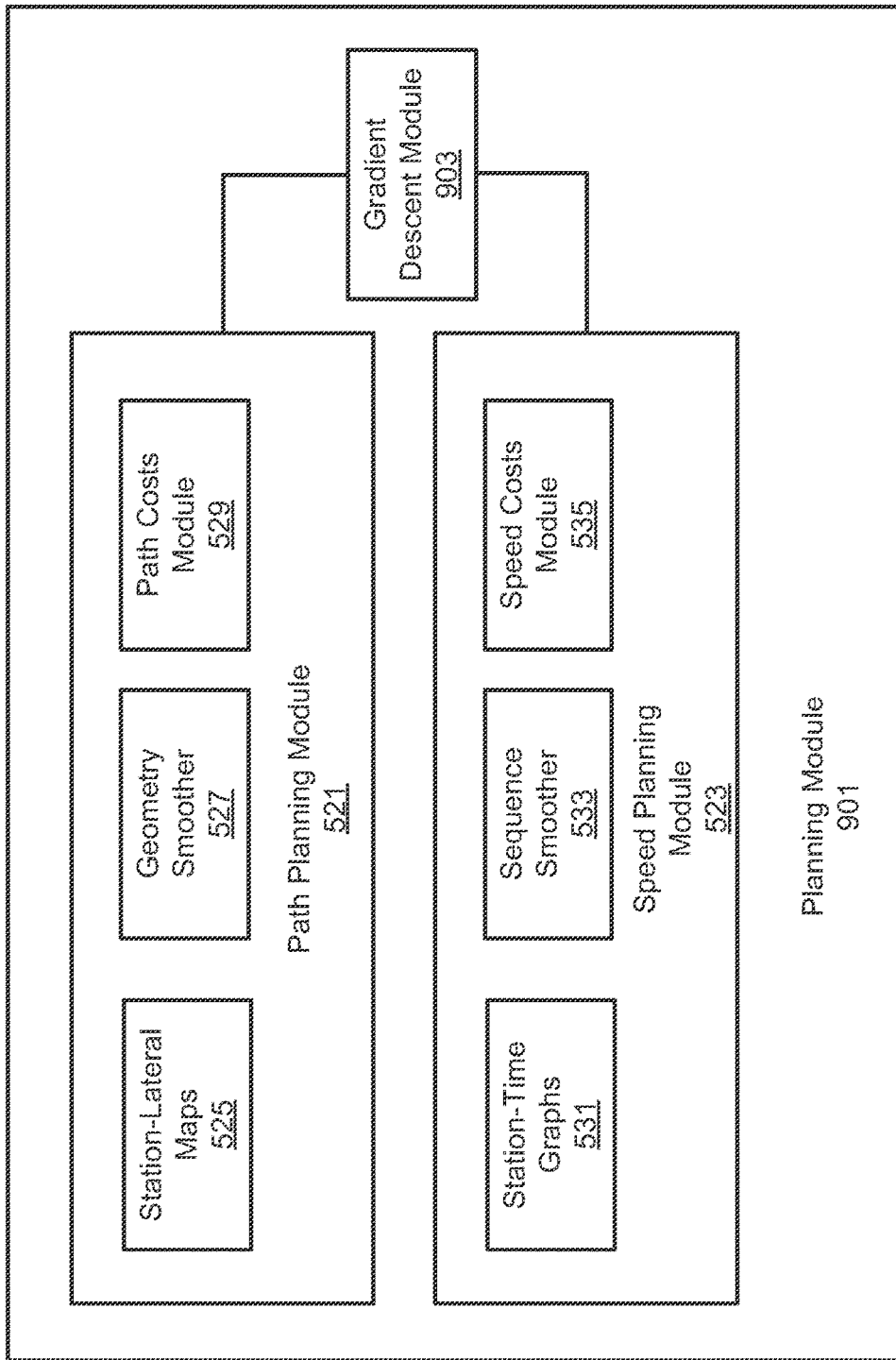
FIG. 9 is a block diagram illustrating an example of a planning module according to one embodiment.

FIG. 9 is a block diagram illustrating an example of a planning module according to one embodiment. Planning module 901 is similar to planning module 305 of FIG. 5B. In addition, planning module 901 includes gradient descent module 903. Gradient descent module 903 can perform a gradient descent optimization method to optimize a cost function. For example, in one embodiment, gradient descent module 903 performs gradient descent optimization for a path cost function similar to the path cost function as described above, replacing the quadratic programming optimization performed by path costs module 529. In another embodiment, gradient descent module 903 performs gradient descent optimization for a speed cost function similar to the speed cost function as described above, replacing the quadratic programming optimization performed by speed costs module 535. Gradient descent is a first order iterative optimization algorithm for finding the minimum of a function. To find a local minimum of a function using gradient descent, an algorithm takes a step proportional to the negative of the gradient of the function at the current point. The algorithm can calculate the differentials (i.e., gradients) of the cost function at the current value and take a step proportional to the differential, and repeat until a minimum point is reached.

Figure 10:
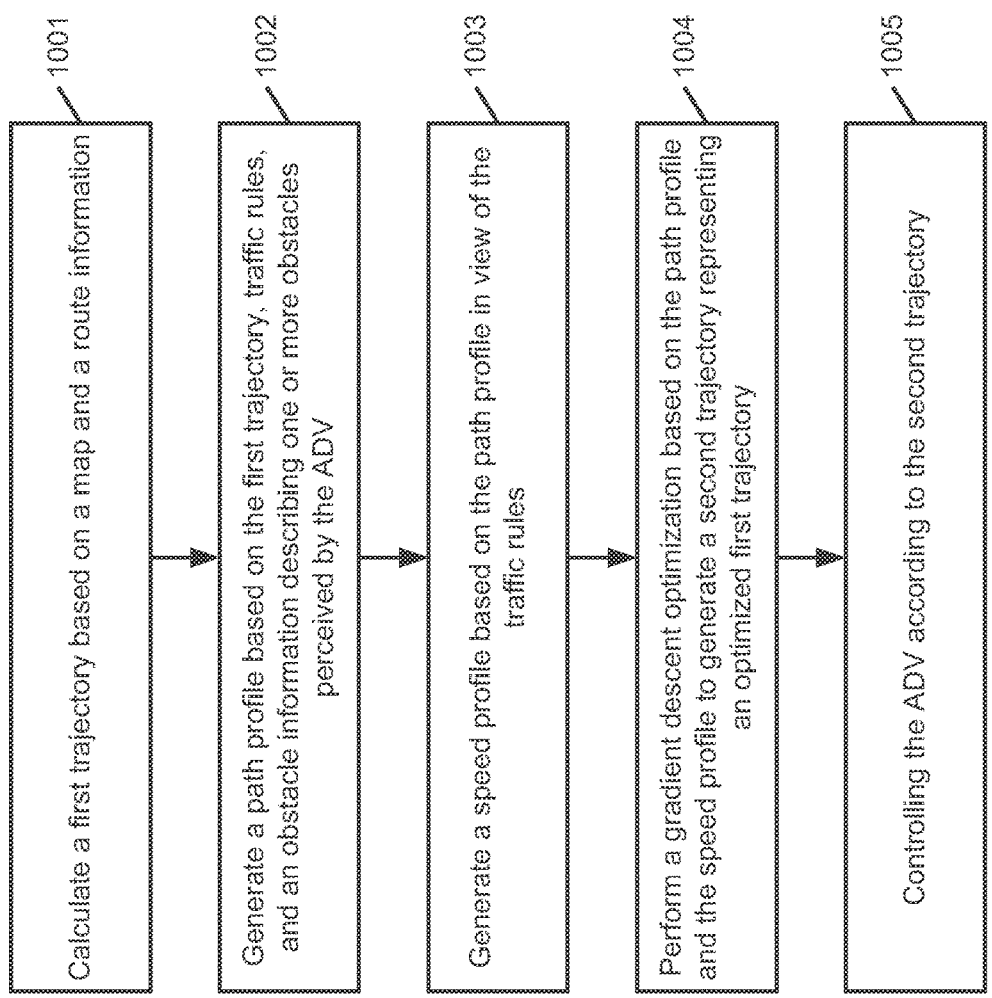
FIG. 10 is a flow diagram illustrating a method according to one embodiment.

FIG. 10 is a flow diagram illustrating a method according to one embodiment. Processing 1000 may be performed by processing logic which may include software, hardware, or a combination thereof. For example, process 1000 may be performed by perception and planning system 110 of an autonomous vehicle. Referring to FIG. 10, at block 1001, processing logic calculates a first trajectory based on a map and a route information. At block 1002, processing logic generates a path profile based on the first trajectory, traffic rules, and an obstacle information describing one or more obstacles perceived by the ADV, where for each of the obstacles, the path profile includes a decision to nudge or yield to left or right of the obstacle. At block 1003, processing logic generates a speed profile based on the path profile in view of the traffic rules. At block 1004, processing logic performs a gradient descent optimization based on the path profile and the speed profile to generate a second trajectory representing an optimized first trajectory. Quadratic programming optimization can be performed using respective path, speed, and/or obstacle cost functions to determine the most optimal route with the minimum total cost. At block 1005, processing logic controls the ADV according to the second trajectory.

In one embodiment, the path profile and the speed profile are generated iteratively using dynamic programming. In one embodiment, the speed profile includes, for each encountered obstacle of the obstacle information, a decision to follow, overtake, yield, stop, or pass the encountered obstacle.

In one embodiment, performing a gradient descent optimization based on the path profile and the speed profile includes optimizing a first and a second cost functions using the gradient descent optimization to generate a station-lateral map and a station-time graph based on the path profile and the speed profile respectively, and generating the second trajectory based on the station-lateral map and the station-time graph to control the ADV according to the second trajectory. In another embodiment, the station-lateral map is generated by forming one or more barriers based on one or more obstacle decisions. In another embodiment, the first and the second cost functions includes a heading, a curvature, and a distance, an acceleration, and a jerk costs. In another embodiment, processing logic further interpolates a number of points of the second trajectory that are absent from the first trajectory based on the station-lateral map and the station-time graph.

Figure 11:
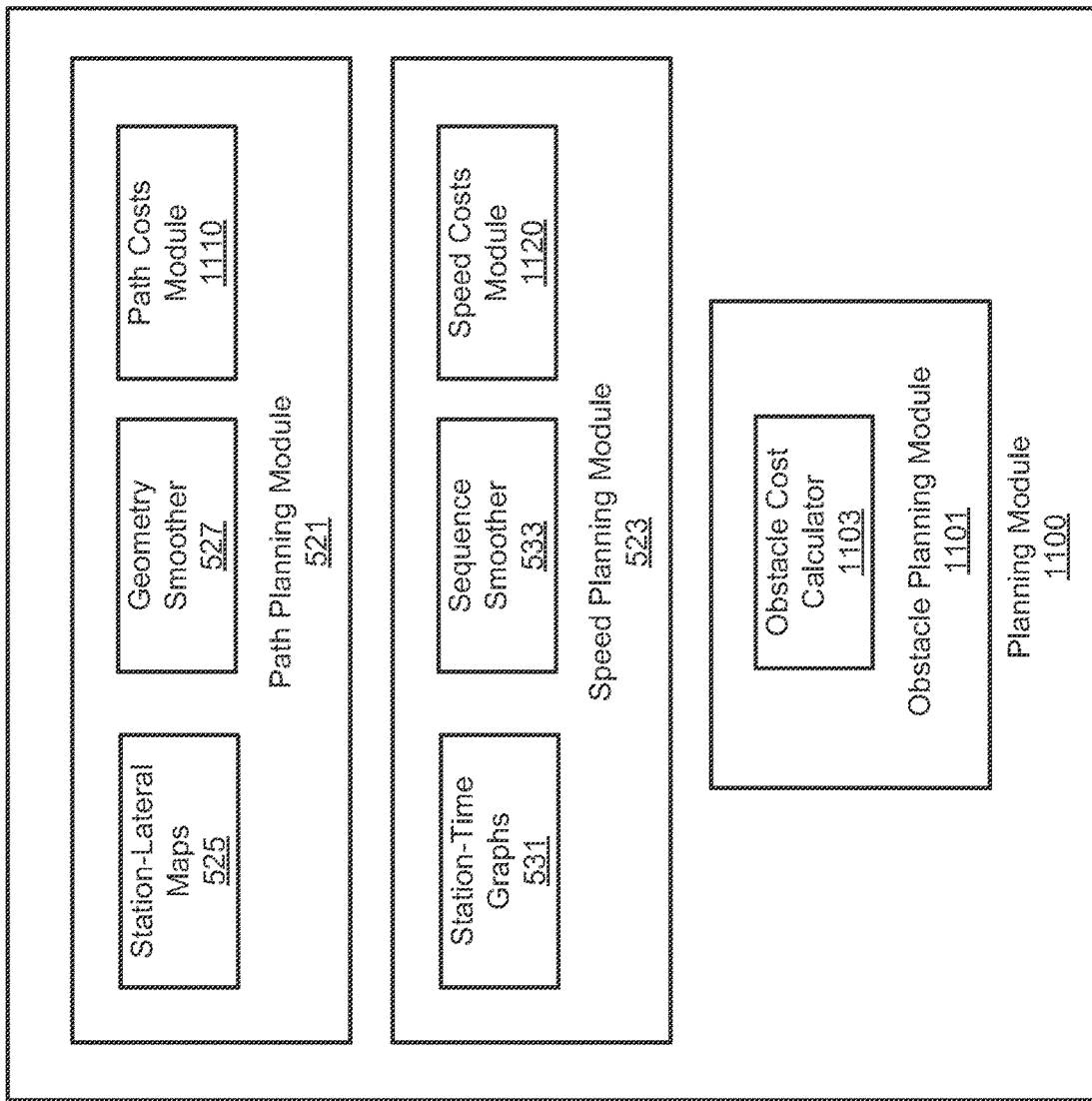
FIG. 11 is a block diagram illustrating an example of a planning module according to one embodiment.
Figure 12A:
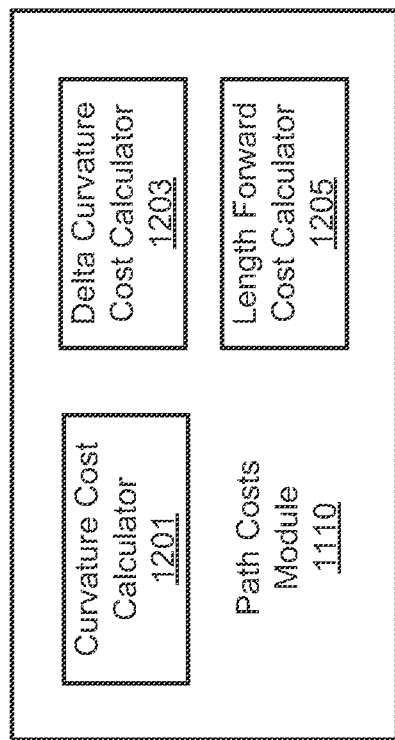
FIGS. 12A-12B are block diagrams illustrating a path costs module and a speed costs module respectively according to one embodiment.
Figure 12B:
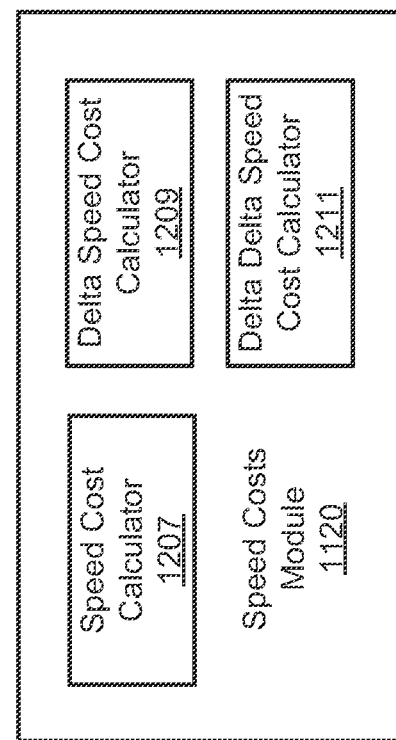

In one embodiment, a planning module can determine all possible and/or likely decisions for routing the ADV from a start to an end location in view of obstacles encountered by an ADV. Without initial constraints, planning module 1100 optimizes every possible trajectories based on reference lines provided by routing module 307 in view of possible and/or likely obstacle decisions (i.e., avoid, overtake, pass, yield, nudge, stop, ignore) and calculates a minimum total cost for each of the possible trajectories. For example, for a red traffic light obstacle in the vehicular lane, although other obstacle decisions are possible, the likely decision will be to stop the ADV. Planning module 1100 then selects the trajectory with the lowest total cost to control the ADV. FIG. 11 is a block diagram illustrating an example of a planning module according to one embodiment. FIGS. 12A and 12B are block diagrams illustrating a path costs module and a speed costs module respectively according to one embodiment.

Referring to FIG. 11, planning module 1100 is similar to planning module 305 of FIG. 5B. Planning module 1100 includes obstacle planning module 1101, path cost module 1110, and speed cost module 1120. Obstacle planning module 1101 includes obstacle cost calculator 1103. Obstacle planning module 1101 plans how an ADV is controlled in view of an obstacle. Obstacle cost calculator 1103 can calculate obstacle costs for each obstacle perceived by the ADV. The obstacle cost can represent a cost to avoid a collision between an obstacle and the particular trajectory being calculated. For example, a cost to avoid a collision between an obstacle and the trajectory can includes a cost based on a distance ("distance cost") between the nearest point of the trajectory and the obstacle and a cost for a passing speed ("cost for passing speed") estimated to pass the obstacle.

In one embodiment, when the distance between the trajectory and the obstacle is greater than a threshold value, such as two meters, the distance cost can be ignored. In one embodiment, the distance cost is an exponential function. For example, the distance cost can be: $w_1 * exp^{(2-x)} - 1$, where $w_1$ is a weight factor and x is the distance between the trajectory and the obstacle. In one embodiment, the cost for passing speed is a logarithmic function. For example, the cost for passing speed can be: $w_2 * log(speed, 4)$, where $w_2$ is a weight factor and speed is the relative speed of the ADV with reference to the passing obstacle. In one embodiment, the total obstacle cost is calculated based on the distance cost and the cost for passing speed, e.g., a product of two costs: $(w_1 * exp^{(2-x)} - 1) * (w_2 * log(speed, 4))$.

Path cost module 1110 is similar to path cost module 529 of FIG. 5B. Referring to FIG. 12A, path cost module 1110 includes curvature cost calculator 1201, delta curvature cost calculator 1203, and length forward cost calculator 1205. Curvature cost calculator 1201 calculates a curvature cost based on a curvature of each point along the trajectory. In one embodiment, a curvature cost is an exponential function. For example, the curvature cost can be $w_3 * exp(100 * c) - 1$, where $w_3$ is a weighting factor, and c is a curvature typically ranging from [0, 0.2]. Delta curvature cost calculator 1203 can calculate a delta curvature cost based on a difference of curvatures between two adjacent points of the trajectory being calculated. In one embodiment, delta curvature cost is an exponential function. For example, the delta curvature cost can be $w_4 * exp(100 * c') - 1$, where $w_4$ is a weighting factor, and c' is a change in curvature. Length forward cost calculator 1205 can calculate a length forward cost representing a cost to move forward towards a reference line of the trajectory. In one embodiment, length forward cost is a linear function. For example, the length forward cost can be $w_5 * (X - x)$ where $w_5$ is a weighting factor, X is a distance to destination of the path segment and x is a distance travelled. In one embodiment, path cost module 1110 can calculate a total path cost based on a curvature cost, a delta curvature cost, and/or a length forward cost of each point for all points along the trajectory being calculated. For example, the total path cost can be a summation of these three costs of each point for all points along the trajectory being calculated. The path cost can be optimized by quadratic programming and/or gradient descent optimization as described above for a minimum path cost.

Speed cost module 1120 is similar to speed cost module 535 of FIG. 5B. Referring to FIG. 12B, speed cost module 1120 includes speed cost calculator 1207, delta speed cost calculator 1209, and delta delta speed cost calculator 1211. Speed cost calculator 1207 can calculate an individual speed cost based on a speed in view of a speed limit at each point. For example, in one embodiment, the cost function can be an absolute value of the current route speed limit minus an ADV operating speed. The delta speed cost calculator 1209 can calculate a cost to change speed between two adjacent points. The delta delta speed cost calculator 1211 can calculate a cost to change acceleration cost between two adjacent points of the trajectory. In one embodiment, delta speed cost and delta delta speed cost are linear functions.

In another embodiment, delta speed cost and delta delta speed cost are constants when the delta speed and delta delta speed is below or above a predetermined threshold value respectively. In one embodiment, speed cost module 1120 then calculates a total speed cost based on a speed cost, a delta speed cost, and/or a delta delta speed cost of each point for all points along the trajectory being calculated. For example, the total speed cost can be a summation of these three costs of each point for all points along a station-time curve being calculated. The total speed cost can be optimized by quadratic programming and/or gradient descent optimization as described above for a minimum speed cost. A trajectory can then be selected by planning module 1100 having a combined total minimum path and speed costs to control an ADV autonomously.

Figure 13:
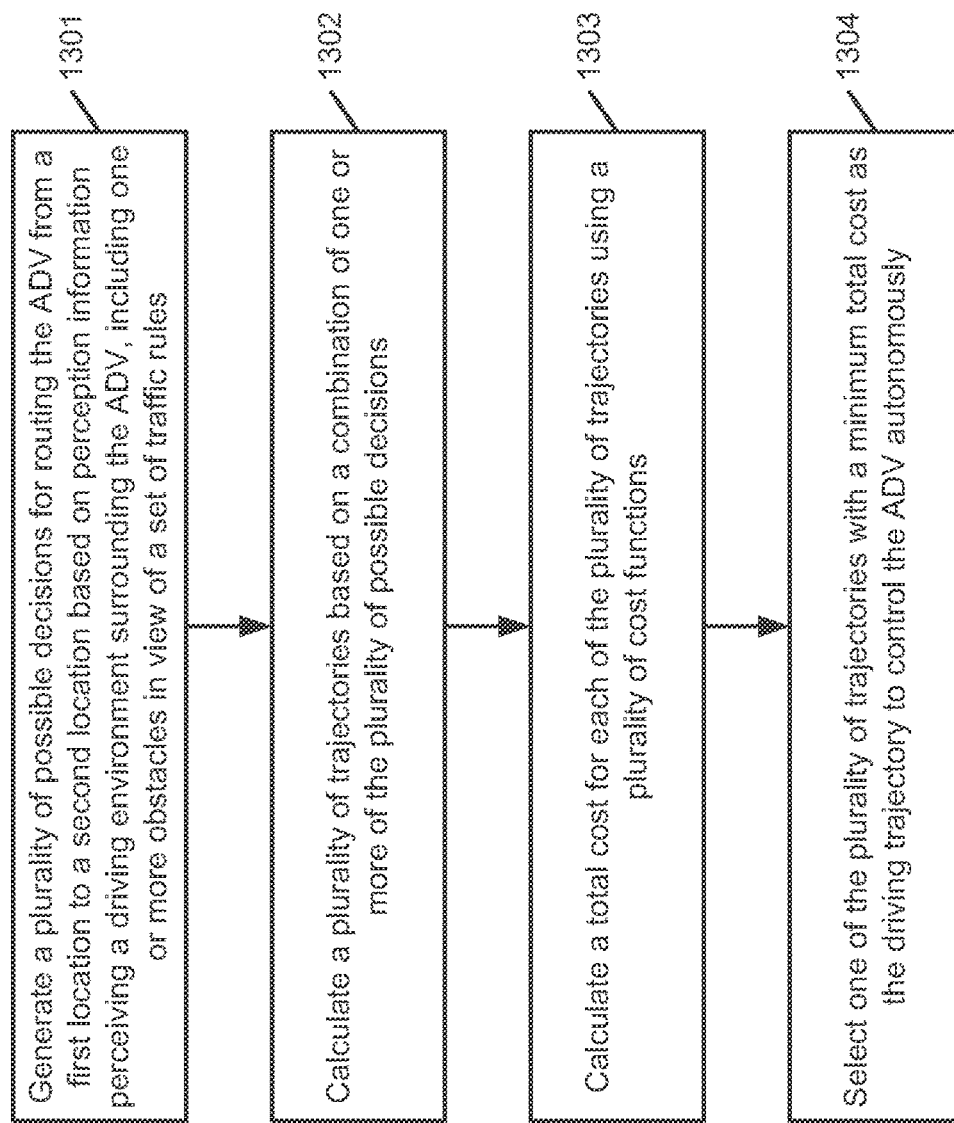
FIG. 13 is a flow diagram illustrating a method according to one embodiment.

FIG. 13 is a flow diagram illustrating a method according to one embodiment. Processing 1300 may be performed by processing logic which may include software, hardware, or a combination thereof. For example, process 1300 may be performed by perception and planning system 110 of an autonomous vehicle. Referring to FIG. 13, at block 1301, processing logic generates a number of possible decisions for routing the ADV from a first location to a second location based on perception information perceiving a driving environment surrounding the ADV, including one or more obstacles in view of a set of traffic rules. At block 1302, processing logic calculates a number of trajectories based on a combination of one or more of the possible decisions. At block 1303, processing logic calculates a total cost for each of the trajectories using a number of cost functions. At block 1304, processing logic selects one of the trajectories with a minimum total cost as the driving trajectory to control the ADV autonomously.

Figure 14A:
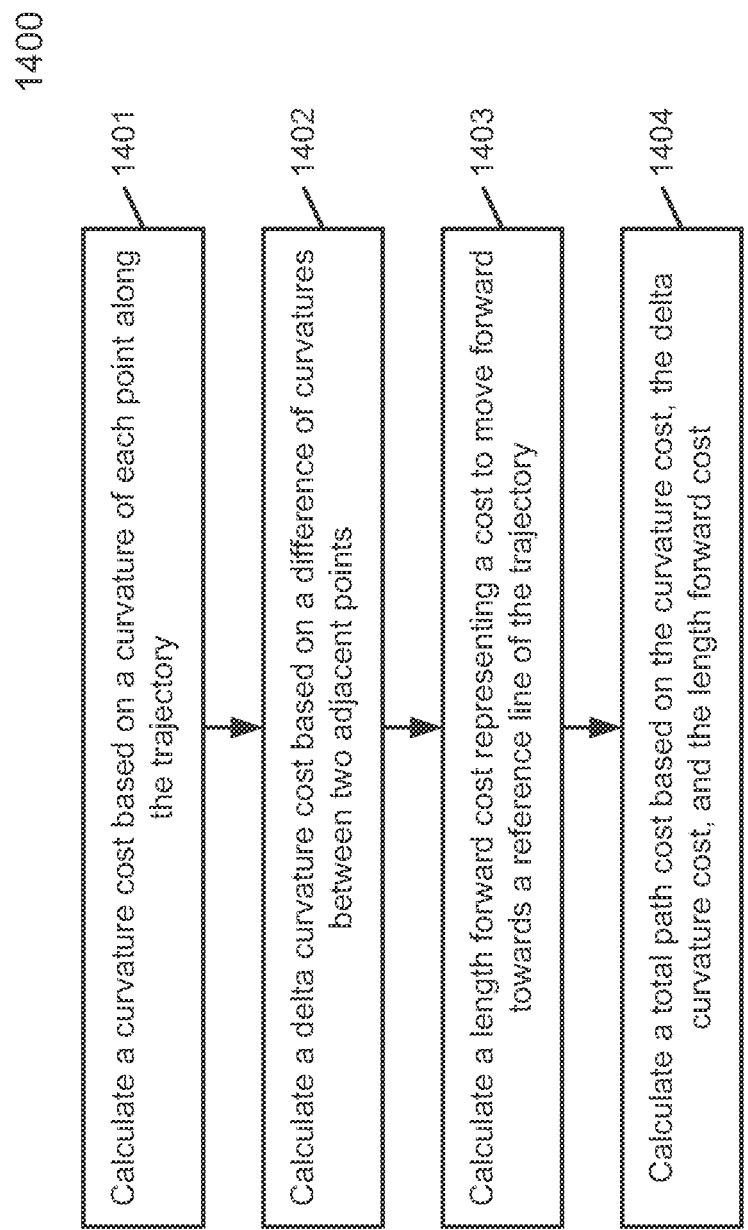
FIG. 14A is a flow diagram illustrating a method according to one embodiment.

FIG. 14A is a flow diagram illustrating a process of calculating a path cost according to one embodiment. Process 1400 may be performed as a part of block 1303 of FIG. 13. Process 1400 may be performed by processing logic which may include software, hardware, or a combination thereof. For example, process 1400 may be performed by path costs module 1110 of an autonomous vehicle. Referring to FIG. 14A, at block 1401, processing logic calculates a curvature cost based on a curvature of each point along the trajectory. At block 1402, processing logic calculates a delta curvature cost based on a difference of curvatures between two adjacent points. At block 1403, processing logic calculates a length forward cost representing a cost to move forward towards a reference line of the trajectory. At block 1404, processing logic calculates a total path cost based on the curvature cost, the delta curvature cost, and the length forward cost.

Figure 14B:
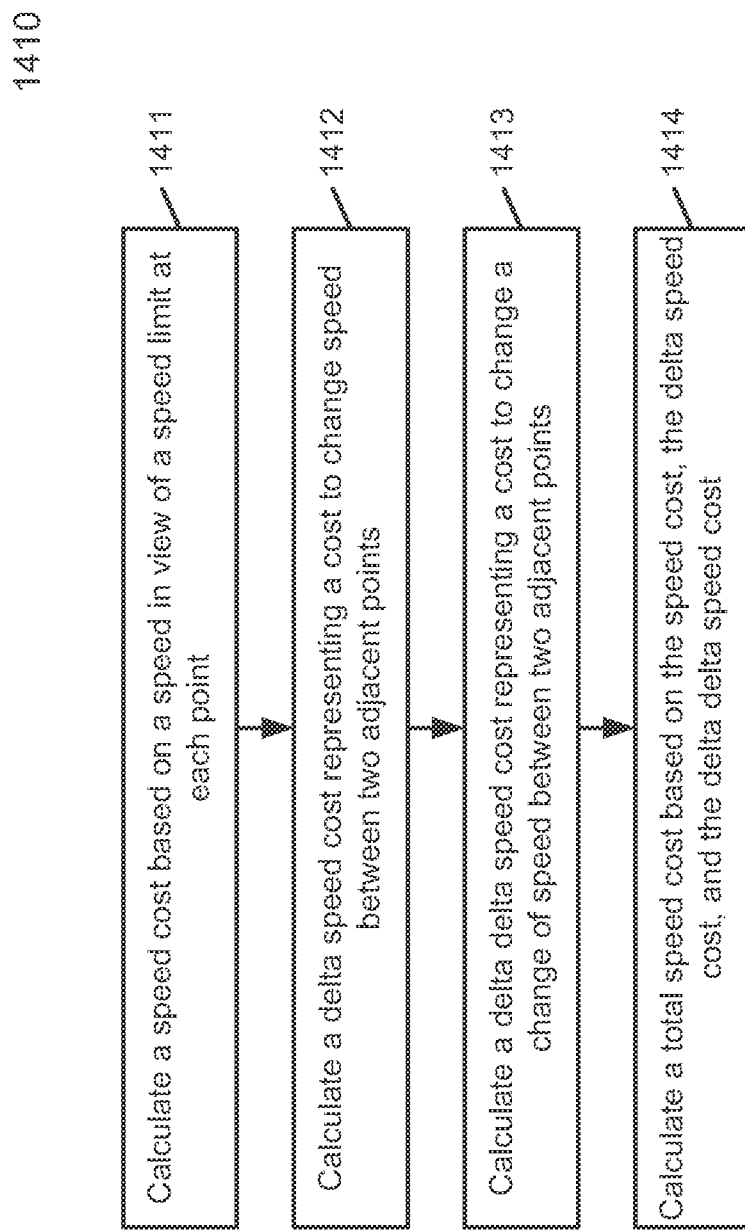
FIG. 14B is a flow diagram illustrating a method according to one embodiment.

FIG. 14B is a flow diagram illustrating a process of calculating a speed cost according to one embodiment. Process 1410 may be performed as a part of block 1303 of FIG. 13. Processing 1410 may be performed by processing logic which may include software, hardware, or a combination thereof. For example, process 1410 may be performed by speed costs module 1120 of an autonomous vehicle. Referring to FIG. 14B, at block 1411, processing logic calculates a speed cost based on a speed in view of a speed limit at each point. At block 1412, processing logic calculates a delta speed cost representing a cost to change speed between two adjacent points. At block 1413, processing logic calculates a delta delta speed cost representing a cost to change a change of speed between two adjacent points. At block 1414, processing logic calculates a total speed cost based on the speed cost, the delta speed cost, and the delta delta speed cost.

In one embodiment, for each trajectory, processing logic further calculates a path cost using a path cost function representing a cost to route the ADV from the first location to the second location according to the trajectory. Processing logic also calculates a speed cost function representing a cost to control the ADV at different speeds along the trajectory, where the total cost is calculated based on the path cost and the speed cost.

In one embodiment, calculating a path cost using a path cost function includes calculating a curvature cost based on a curvature of each point along the trajectory and calculating a delta curvature cost based on a difference of curvatures between two adjacent points, where the path cost is calculated based on the curvature costs and the delta curvature costs of all points along the trajectory. In another embodiment, processing logic further calculates a length forward cost representing a cost to move forward towards a reference line of the trajectory, where the path cost is calculated further based on the length forward cost of each point.

In one embodiment, calculating a speed cost using a speed cost function includes calculating an individual speed cost based on a speed in view of a speed limit at each point and calculating a delta speed cost representing a cost to change speed between two adjacent points, where the speed cost is calculated based on the individual speed costs and the delta speed costs of all points along the trajectory. In another embodiment, processing logic further calculates an acceleration cost based on an acceleration of each point of the trajectory, where the speed cost is calculated further based on the acceleration cost of each point.

In one embodiment, processing logic further calculates an obstacle cost for each obstacle perceived, the obstacle cost representing a cost to avoid collision between the trajectory and the obstacle, where the total cost is calculated further based on the obstacle cost. In another embodiment, calculating an obstacle cost includes calculating a minimum distance between the trajectory and the obstacle and calculating a passing speed estimated to pass the obstacle, where the obstacle cost is calculated based on the minimum distance and the passing speed.

Figure 15:
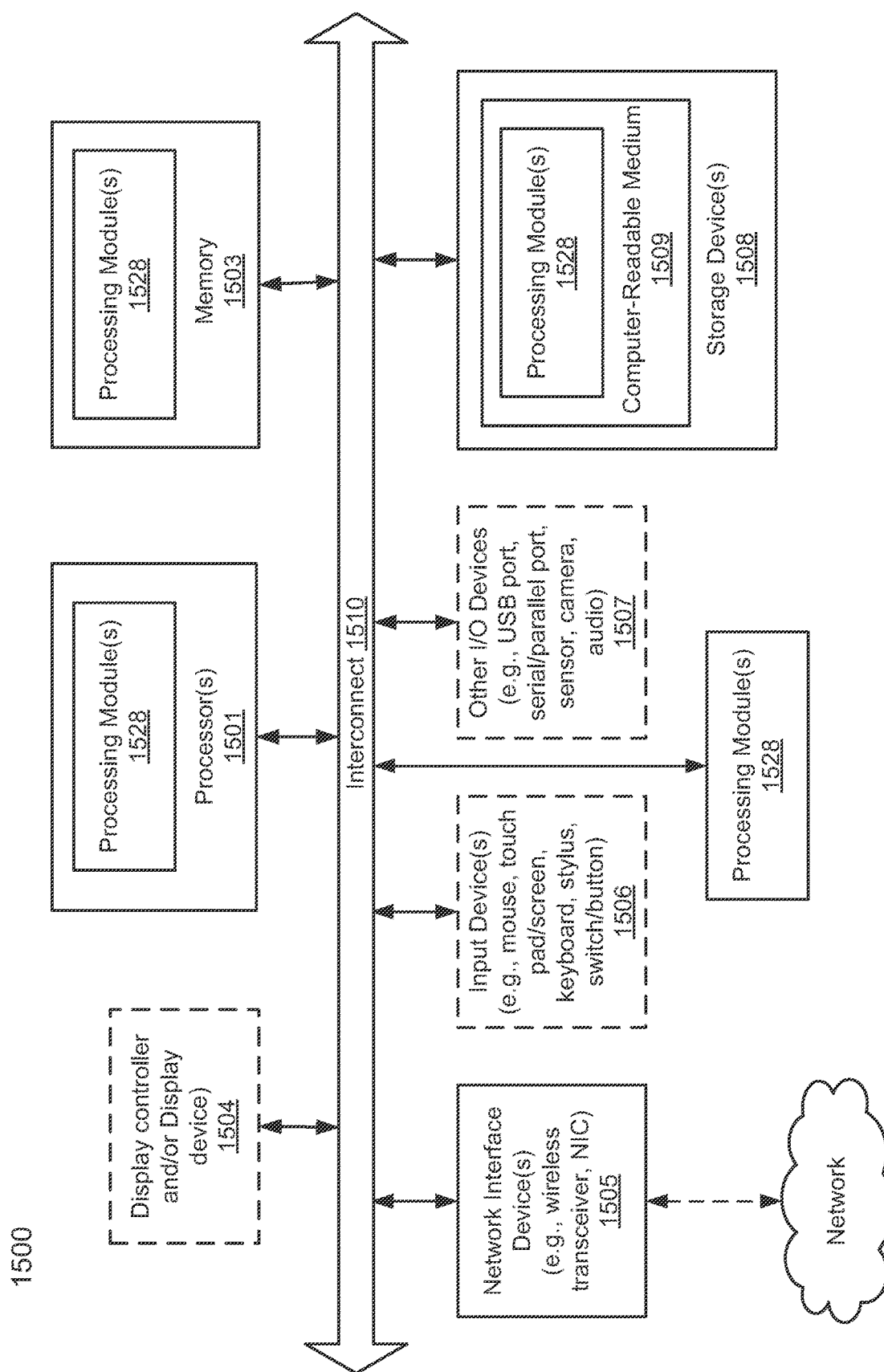
FIG. 15 is a block diagram illustrating a data processing system according to one embodiment.

FIG. 15 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s)

1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, decision module 304, planning module 305, control module 306 of FIGS. 3A and 3B, path decision module 501, speed decision module 502 of FIG. 5A, and path planning module 521, speed planning module 523 of FIG. 5B. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate a driving trajectory for an autonomous driving vehicle (ADV), the method comprising:
    calculating a first trajectory based on a map and a route information;
    generating a path profile based on the first trajectory, traffic rules, and an obstacle information describing one or more obstacles perceived by the ADV, wherein for each of the obstacles, the path profile includes a decision to yield or approach to left or right of the obstacle;
    generating a speed profile based on the path profile in view of the traffic rules, wherein the speed profile includes a decision to yield or overtake the obstacle, the path profile and the speed profile being generated iteratively using dynamic programming, wherein for each of the obstacles, the speed profile comprises a rough speed profile having speed candidates at different points in time being iterated using the dynamic programming, the rough speed profile including a station-time graph being used as initial constraint to calculate an optimal station-time curve;
    performing a gradient descent optimization based on the path profile and the speed profile to generate a second trajectory representing an optimized first trajectory, wherein performance of the gradient descent optimization includes repeatedly calculating differentials of a path cost function at a current value and taking a step proportional to the differential until a minimum is reached; and
    controlling the ADV according to the second trajectory.

2. The method of claim 1, wherein generating the path profile and the speed profile using dynamic programming includes breaking down a problem to a sequence of value functions and looking up a previously computed solution for a repeating value function.

3. The method of claim 1, wherein the speed profile comprises, for each encountered obstacle of the obstacle information, a decision to follow, overtake, yield, stop, or pass the encountered obstacle.

4. The method of claim 1, wherein performing a gradient descent optimization based on the path profile and the speed profile comprises:
    optimizing a first and a second cost functions using the gradient descent optimization to generate a station-lateral map and a station-time graph based on the path profile and the speed profile respectively; and
    generating the second trajectory based on the station-lateral map and the station-time graph to control the ADV according to the second trajectory.

5. The method of claim 4, wherein the station-lateral map is generated by forming one or more barriers based on one or more obstacle decisions.

6. The method of claim 4, wherein the first and the second cost functions comprise a heading, a curvature, and a distance, an acceleration, and a jerk costs.

7. The method of claim 4, further comprising interpolating a plurality of points to the second trajectory that are absent from the first trajectory based on the station-lateral map and the station-time graph.

8. A non-transitory machine-readable medium having instructions stored therein, which when executed by a processor, cause the processor to perform operations, the operations comprising:
    calculating a first trajectory based on a map and a route information;
    generating a path profile based on the first trajectory, traffic rules, and an obstacle information describing one or more obstacles perceived by the ADV, wherein for each of the obstacles, the path profile includes a decision to yield or approach to left or right of the obstacle;
    generating a speed profile based on the path profile in view of the traffic rules, wherein the speed profile includes a decision to yield or overtake the obstacle, the path profile and the speed profile being generated iteratively using dynamic programming, wherein for each of the obstacles, the speed profile comprises a rough speed profile having speed candidates at different points in time being iterated using the dynamic programming, the rough speed profile including a station-time graph being used as initial constraint to calculate an optimal station-time curve;
    performing a gradient descent optimization based on the path profile and the speed profile to generate a second trajectory representing an optimized first trajectory, wherein performance of the gradient descent optimization includes repeatedly calculating differentials of a path cost function at a current value and taking a step proportional to the differential until a minimum is reached; and
    controlling the ADV according to the second trajectory.

9. The non-transitory machine-readable medium of claim 8, wherein generating the path profile and the speed profile includes breaking down a problem to a sequence of value functions and looking up a previously computed solution for a repeating value function.

10. The non-transitory machine-readable medium of claim 8, wherein the speed profile comprises, for each encountered obstacle of the obstacle information, a decision to follow, overtake, yield, stop, or pass the encountered obstacle.

11. The non-transitory machine-readable medium of claim 8, wherein performing a gradient descent optimization based on the path profile and the speed profile comprises:
 optimizing a first and a second cost functions using the gradient descent optimization to generate a station-lateral map and a station-time graph based on the path profile and the speed profile respectively; and
 generating the second trajectory based on the station-lateral map and the station-time graph to control the ADV according to the second trajectory.

12. The non-transitory machine-readable medium of claim 11, wherein the station-lateral map is generated by forming one or more barriers based on one or more obstacle decisions.

13. The non-transitory machine-readable medium of claim 11, wherein the first and the second cost functions comprise a heading, a curvature, and a distance, an acceleration, and a jerk costs.

14. The non-transitory machine-readable medium of claim 11, further comprising interpolating a plurality of points to the second trajectory that are absent from the first trajectory based on the station-lateral map and the station-time graph.

15. A data processing system, comprising:
 a processor; and
 a memory coupled to the processor to store instructions, which when executed by the processor, cause the processor to perform operations, the operations including calculating a first trajectory based on a map and a route information;
  generating a path profile based on the first trajectory, traffic rules, and an obstacle information describing one or more obstacles perceived by the ADV, wherein for each of the obstacles, the path profile includes a decision to yield or approach to left or right of the obstacle;
  generating a speed profile based on the path profile in view of the traffic rules, wherein the speed profile includes a decision to yield or overtake the obstacle, the path profile and the speed profile being generated iteratively using dynamic programming, wherein for each of the obstacles, the speed profile comprises a rough speed profile having speed candidates at different points in time being iterated using the dynamic programming, the rough speed profile including a station-time graph being used as initial constraint to calculate an optimal station-time curve;
  performing a gradient descent optimization based on the path profile and the speed profile to generate a second trajectory representing an optimized first trajectory, wherein performance of the gradient descent optimization includes repeatedly calculating differentials of a path cost function at a current value and taking a step proportional to the differential until a minimum is reached; and
  controlling the ADV according to the second trajectory.

16. The system of claim 15, wherein generating the path profile and the speed profile using dynamic programming includes breaking down a problem to a sequence of value functions and looking up a previously computed solution for a repeating value function.

17. The system of claim 15, wherein the speed profile comprises, for each encountered obstacle of the obstacle information, a decision to follow, overtake, yield, stop, or pass the encountered obstacle.

18. The system of claim 15, wherein performing a gradient descent optimization based on the path profile and the speed profile comprises:
 optimizing a first and a second cost functions using the gradient descent optimization to generate a station-lateral map and a station-time graph based on the path profile and the speed profile respectively; and
 generating the second trajectory based on the station-lateral map and the station-time graph to control the ADV according to the second trajectory.

19. The system of claim 18, wherein the station-lateral map is generated by forming one or more barriers based on one or more obstacle decisions.

20. The system of claim 18, wherein the first and the second cost functions comprise a heading, a curvature, and a distance, an acceleration, and a jerk costs.

21. The system of claim 18, further comprising interpolating a plurality of points to the second trajectory that are absent from the first trajectory based on the station-lateral map and the station-time graph.

* * * * *